United States Patent [19]
Masaki

[11] Patent Number: 4,636,817
[45] Date of Patent: Jan. 13, 1987

[54] IMAGE FORMING APPARATUS WITH SHUTTER ARRAY ELEMENT

[75] Inventor: Yuichi Masaki, Kawasaki, Japan

[73] Assignee: Canon Kabushiki Kaisha, Tokyo, Japan

[21] Appl. No.: 677,499

[22] Filed: Dec. 3, 1984

[51] Int. Cl.$^4$ .............................................. G01D 15/14
[52] U.S. Cl. ...................................... 346/160; 50/336; 346/108
[58] Field of Search ................ 346/160, 108; 350/356, 350/361, 347 E, 336; 358/300, 212, 213

[56] References Cited
U.S. PATENT DOCUMENTS 4,524,372  6/1985  De Cock et al. .................... 350/356

Primary Examiner—Arthur G. Evans
Attorney, Agent, or Firm—Fitzpatrick, Cella, Harper & Scinto

[57] ABSTRACT

Two rows or three rows of shutter apertures are arranged in mutually staggered fashion to form a shutter array element. In the case of two rows of shutter apertures, the distance between adjacent shutter apertures in each row is set to be 1.22–2.0 times the length of one shutter aperture in the direction of extension of each row of the shutter apertures, while, in the case of three rows of shutter apertures, the distance between adjacent shutter apertures in each row is 2.4–3.3 times the length of one aperture in the direction of each row. When this shutter array element is used as a light signal generating means for an electrophotographic printer, improvement in quality of images can be attained.

19 Claims, 12 Drawing Figures

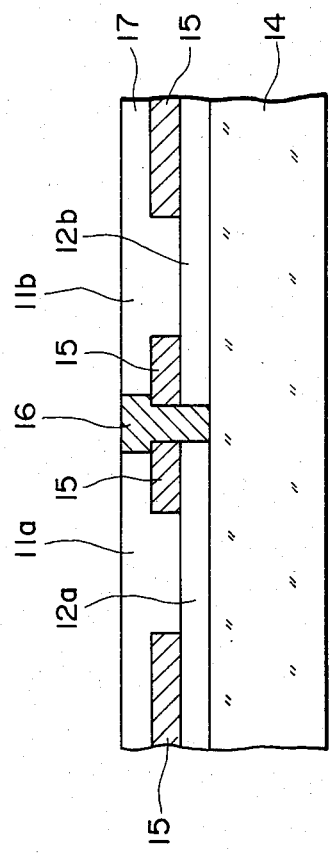
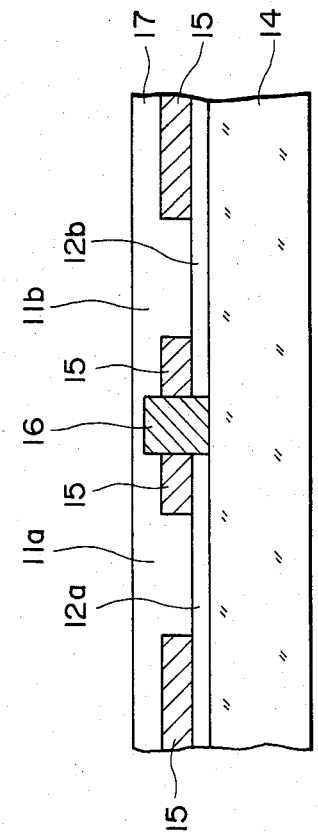
FIG. 2
FIG. 3

IMAGE FORMING APPARATUS WITH SHUTTER ARRAY ELEMENT

BACKGROUND OF THE INVENTION

The present invention relates to an image forming apparatus with a shutter array and more particularly an improvement of an electrophotographic dot image formed by an electrophotographic printer with a liquid crystal shutter array light signal generating means.

The liquid crystal shutter array utilizes the electro-optical modulation capability of a liquid crystal. The liquid crystal modulation units are arranged in an array and light is illuminated on the modulation unit array in such a way that transmitted light rays are selectively derived, whereby a light signal corresponding to an electrical image signal can be obtained. The light signal is focused on an electrophotographic photosensitive body, whereby a digital copy can be obtained.

The advantages of such a crystal-optical shutter array are:

1. When used in an electrophotographic printer, the printer can be made compact in size and light in weight.
2. Mechanically movably parts such as a polygon scanner used in a laser beam printer can be eliminated so that no noise problem arises and strict mechanical tolerances can be reduced.

However, there is a disadvantage that an electrophotographic image formed by an electrophotographic printer with liquid crystal shutter array light signal generating means is inferior in resolution to an electrophotographic image formed by a laser beam printer. Especially in the case of a liquid crystal shutter array using a ½ times-sharing drive system type, there are provided two rows of shutter apertures and the shutter apertures in one row are staggered relative to those in the other row. In the first ½ period, the shutter apertures in the first row are operated and in the second ½ period, the shutter apertures in the second row are operated so that one line image may be formed. In this case, dot images formed by the operation of the shutter apertures in the first row are overlapped with dot images formed by the operation of the shutter apertures in the second row in one line image. As a result, one line image has density differences.

In the case of a liquid crystal shutter array using a ⅓ time-division drive system, there are provided three rows of shutter apertures and the shutter apertures in a first row are staggered relative to those in a second row which in turn is staggered relative to those in a third row. During a first ⅓ period, the shutter apertures in the first row are operated, during a second ⅓ period the shutter apertures in the second row are operated and during a third ⅓ period, the shutter apertures in the third row are operated so that one line image is formed. However, dot images formed by the operation of the shutter apertures in the first row are overlapped with the dot images formed by the operation of the shutter apertures in the second and third rows in one line image. As a result, one line image also has density differences. Furthermore, when one dot image is observed, the periphery of the dot image is "blurred" so that the dot image lacks sharpness.

In the case of a printer with a liquid crystal-optical shutter array of the type described above, a light signal which has been transmitted through an aperture cannot be sufficiently focused so that a dot image obtained has blurs and a low resolution.

SUMMARY OF THE INVENTION

In view of the above, an object of the present invention is to provide an image forming apparatus with a shutter array which can substantially overcome the problems encountered in the conventional image forming devices.

Another object of the present invention is to provide an electrophotographic printer with a liquid crystal shutter array which can improve resolution and sharpness of an electrophotographic image.

A liquid crystal shutter array element used in the present invention has two or three rows of shutter apertures arranged in a mutually staggered fashion, i.e., in such a way that the shutter apertures in a first row are staggered relative to those in a second row which in turn are staggered relative to those in a third row, if any, and is characterized in that in the case of the two row arrangment, the distance between the adjacent shutter apertures in each row is 1.22-2.0 times the length of one shutter aperture in the direction of extension of each row, while, in the case of the three row arrangement, the distance between the adjacent shutter apertures in each row is 2.4-3.4 times the length of one shutter aperture in the direction of extension of each row.

The above and other objects, effects, features and advantages of the present invention will become more apparent from the following description of preferred embodiments thereof taken in conjunction with the accompanying drawings.

BRIEF DESCRIPTION OF THE DRAWINGS

FIGS. 2 and 3 are sectional views of a row electrode base plate taken along the line A—A of FIG. 1;

DETAILED DESCRIPTION OF PREFERRED EMBODIMENTS

Resolution and sharpness of a dot image formed by an electrophotographic printer (image forming apparatus) with a light signal generator provided with liquid crystal array consisting of two rows of shutter apertures can be improved so that no density variation occurs in one line of an electrophotographic image, whereby a sharp image can be obtained. Especially when the distance between an adjacent pair of shutter apertures in each row of shutter apertures is set to 1.22–2.0 times, more preferably 1.4–1.8 times and particularly preferably 1.5–1.6 times the length in the axial direction or direction of extension of the row of shutter apertures, "blur" of a dot image can be effectively prevented so that resolution and sharpness of an image can be improved.

This embodiment of the present invention will be described in detail with reference to the accompanying drawings.

Figure 1:
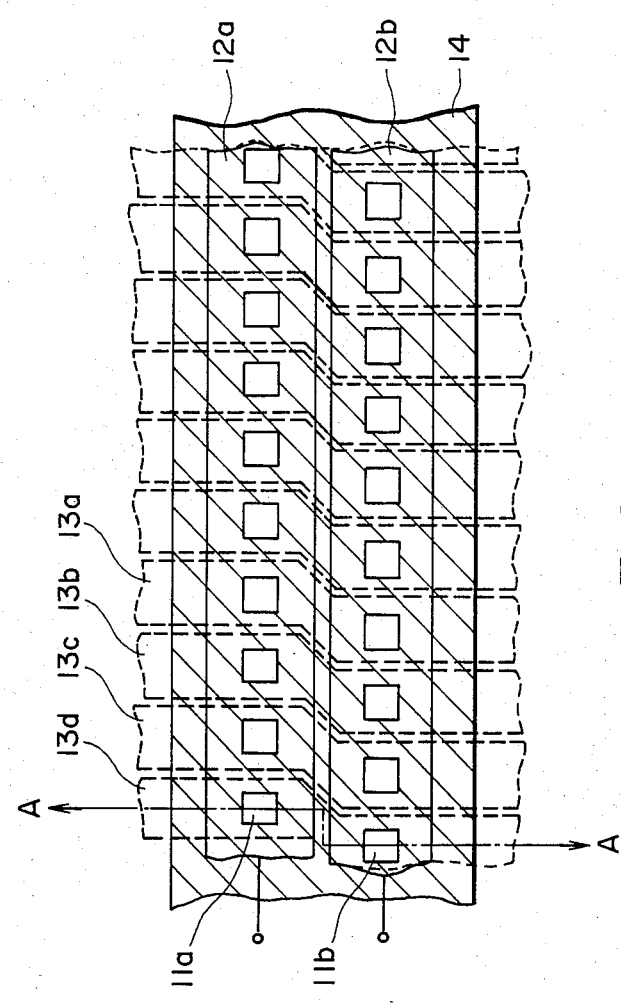
FIG. 1 is a plan view of a liquid crystal array used in the present invention.

Referring first to FIGS. 1, 2 and 3 two rows of shutter apertures 11 (11a and 11b) are disposed and staggered with each other. More particularly, each shutter aperture 11 is disposed at an intersection of a row electrode 12 (12a and 12b) and a signal electrode 13 (13a, 13b, 13c, 13d, ... ). According to the present invention, the row electrodes 12 are formed on a base plate 14 (such as glass, plastic or the like) and a metal light-shielding mask 15 is formed over the row electrode 12 (12a and 12b) except those areas which constitute the shutter apertures 11. Furthermore, a colored insulating film 16 is interposed between the row electrodes 12a and 12b. Reference numeral 17 denotes an insulating film of a synthetic resin or the like.

An example of the process for forming the row electrode plate shown in FIG. 2 is now explained. It should be understood that row electrodes 12a and 12b made of a transparent conductive thin film and a metallic light shielding mask 15 have already been formed on the inner surface of the glass electrode plate 14. A film of polyvinyl alcohol (PVA) serving as an orientation-controlling film is formed thereon. In this example, a mixture of an aqueous solution of 10% of Gosenol (Nippon Gosei Kagaku Kogyo) EG-05, as PVA, and ammonium bichromate, as a photosensitizer, added thereto in a proportion of 5% with respect to the solid part of the PVA, is spin-coated onto the surface of the electrode plate 14 (6000 r.p.m., 10 seconds). Thereafter, the coating thus formed is heated at a temperature of about 60° l C. for 15 minutes to form a uniform insulating film (precursor of 17 in FIG. 3).

Then, the PVA film is subjected to exposure for 10 to 15 seconds with the peripheral edge portion thereof being masked. The PVA film thus exposed is developed for 30 seconds with pure water to remove the peripheral edges (not shown) which have not been exposed. Thereafter, the PVA film thus developed is dried by blowing N$_2$ gas thereto, and then the PVA film thus dried is further heat-dried at a temperature of 80° C. for 5 minutes.

Then, a photoresist (FPPR #800, Fuji Yakuhin Kogyo K.K.) is spin-coated (2000 r.p.m., 10 seconds). Thereafter, the coating thus formed is heated at a temperature of 80° C. for 5 minutes to form a photoresist layer (not shown). Then, a mask is provided thereto so as to cover a section designated by reference numeral 16 in the figure. In this condition, the photoresist layer is exposed for 7 seconds, and then developed in a developer to selectively remove the photoresist layer in the section 16.

The PVA film on which the photoresist layer is formed is immersed into a dye solution for 5 minutes to dye the PVA coating film which is not covered with the photoresist layer, thereby forming the colored insulating film 16. Herein, a dye selected from, for example, Sumifix Black ENS (Sumitomo Kagaku), Solopheny INGL (Ciba Geigy), Cibacet Grey NH (Ciba Geigy), etc., is dissolved in 2% aqueous solution of NH$_4$OH to form a dye solution. If necessary, a predetermined density of color can be obtained by successive immersion in two or three kinds of dye solutions.

After rinsed with pure water, the article is subjected to a finishing process, including removing of the remaining portion of the photoresist layer with methyl ethyl ketone, rinsing with isopropyl alcohol, drying with fluorethylene vapor, baking (180° C., 15 min.), etc. Further, the orientation process, e.g., the rubbing process is effected, as desired. Thus, a light shielding mask is completed wherein the intermediate or gap portion 26 between row electrodes 12a and 12b is colored opaque.

A preferred example of the process for forming the row electrode plate shown in FIG. 3 is now explained. In FIG. 3, assuming that the row electrodes 12a and 12b, and the metallic light shielding mask 25 have already been formed on the inner surface of the glass electrode plate 14, a polyvinyl alcohol (PVA) film is formed thereon. The PVA film is obtained by spin-coating a mixture of an aqueous solution of 10% of Gosenol (Nippon Gosei Kagaku Kogyo) EG-05 with ammonium bichromate (a photosensitizer) added thereto in a proportion of 5% with respect to the solid part of the PVA onto the surface of the electrode plate 14 with a rotatory spinner (6000 r.p.m., 10 seconds), and heating the coating thus formed at a temperature of 60° C. for 15 minutes.

Then, the PVA film is exposed for 10 to 15 seconds with a mask being aligned so that light is incident solely to the gap (corresponding to the portion 16) defined between the portions 25 of the metal light shielding mask. Then, the development is effected for 30 seconds with pure water to remove the non-exposed portions. Thereafter, the PVA film is dried by blowing N$_2$ gas thereto and then further subjected to heat-drying at a temperature of 80° C. for five minutes.

The PVA film thus obtained is immersed into a dye solution for five minutes to dye the PVA film. Herein a dye selected, for example, from Sumifix Black ENS (Sumitomo Kagaku), Solopheny INGL (Ciba Geigy), Cibacet Grey NH (Ciba Geigy), etc., is dissolved in 2% aqueous solution of NH$_4$OH to form a dye solution. If necessary, a predetermined color density is obtained by successive immersion in two or three kinds of dye solutions. Thus, the PA film is colored to form a colored insulating film 16.

After rinsed with pure water, the article is subjected to a finishing process including rinsing with isoporpyl alcohol, drying with fluoroethylene vapor, baking (180° C., 15 min.) etc. Thus, a light shielding mask is completed, wherein the gap portion 26 is colored opaque.

On the surface of the light shielding mask, a coating agent obtained with 2.5% NMP (N-methyl pyrrolidone) solution of a polyimide precursor (SP-510, produced by Toray K.K.) is spinner coated (6000 r.p.m. 60 seconds) and is heated for 30 minutes to form the insulating film 17 of polyimide.

Thereafter, the polyimide film is removed at a sealing portion and an electrode terminal portion (e.g., by etching at a temperature of 60° C. for 10 minutes with alkali 10% aqueous solution). Then, the orientation direction of the liquid crystal molecule is determined by rubbing.

The metallic light shielding mask 15 is generally formed by vapor-deposition or plating of a refractive metal such as chromium, aluminum or silver followed by the photolithography process. The metal light shielding mask 15 thus formed has a thickness of about 300 Å to 2000 Å, when formed of chromium.

A liquid crystal-optical shutter array can be constituted by combining the glass electrode plate on which light shielding mask is formed as stated above with a glass electrode plate provided with counter electrodes as used in the prior art and arranging a polarizing plate at the both sides of the electrode plates. In a liquid crystal-optical shutter thus constituted, most of slight quantity of light transmitting through the portion on which the voltage is not applied, as observed in the prior art, is absorbed by the colored or dyed mask, thereby preventing optical sensitization of the portion other than the data portion during the writing step. It is needless to say that a similar effect can be obtained even when the light shielding mask is formed on the counter electrodes. In this instance, a light shielding mask can be formed in a similar manner as explained above by covering a portion except for the portion corresponding to a pattern electrode. Further, a light shielding mask may be formed on both of the pattern electrode side and the counter electrode side.

Figure 4:
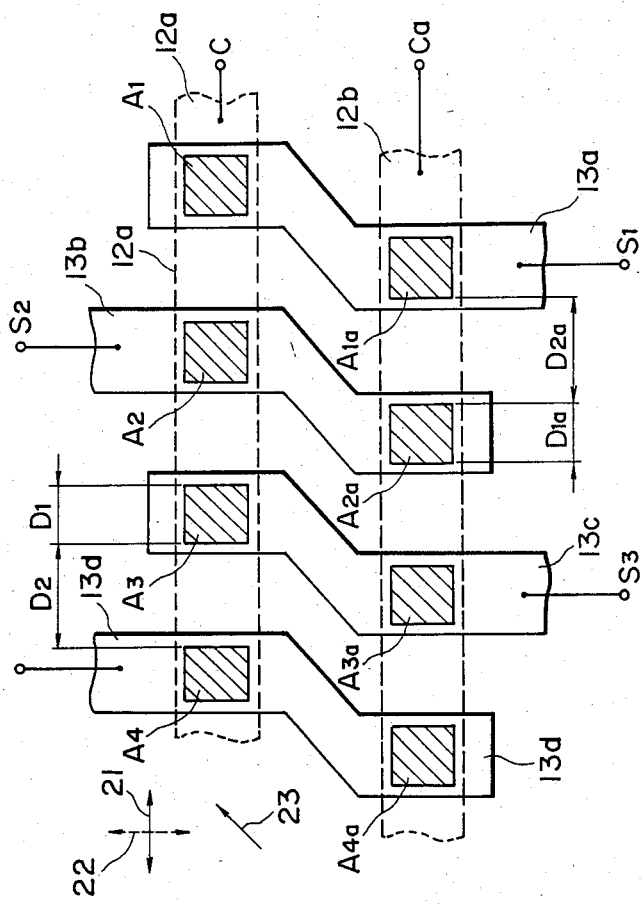
FIG. 4 is a plan view of row electrodes and signal electrodes used in the present invention.

FIG. 4 is a plan view of a liquid crystal shutter array used in the present invention.

According to the present invention, the liquid crystal shutter array with a ½ time-sharing drive electrode system as shown in FIG. 1 may be used. In the liquid crystal shutter array shown in FIG. 4, two row electrodes 12a and 12b are disposed on a first base plate and signal electrodes 13 (13a, 13b, 13c, 13d, . . . ) which intersect with the row electrodes 12a and 12b are disposed on a second base plate which is disposed opposite to the first base plate. Shutter apertures $A_1$, $A_2$, $A_3$, . . . and $A_{1a}$, $A_{2a}$, $A_{3a}$, . . . which are formed at intersections of the row electrodes 12a and 12b and the signal electrodes 13 (13a, 13b, 13c, 13d . . . ) are shown as hatched areas in the figure. The shutter apertures of the first row are staggered relative to those of the second row. The length $D_1$ in the axial or extending direction of the first row of the shutter apertures $A_1$, $A_2$, $A_3$, . . . , the length $D_{1a}$ in the axial direction of the second row of the shutter aperatures $A_{1a}$, $A_{2a}$, $A_{3a}$, . . . , the distance $D_2$ between the adjacent shutter apertures ($A_1$ and $A_2$, $A_2$ and $A_3$, . . . ) of the first row and the distance $D_{2a}$ between the adjacent shutter aperture $A_{1a}$ and $A_{2a}$, $A_{2a}$ and $A_{3a}$, . . . ) of the second row are selected to satisfy the following conditions as described hereinbefore:

$D_2 = (1.22 - 2.0) \times D_1$, and $D_{2a} = (1.22 - 2.0) \times D_{1a}$

It is preferred that the distance $D_1$ or $D_{1a}$ be 70–90 μm and that the distance $D_2$ and $D_{2a}$ be 110–130 μm, and in an optimum examples the length $D_1$ or $D_{1a}$ may be about 80 μm and that the distance $D_2$ or $D_{2a}$ may be about 120 μm.

It is preferred that the longitudinal length of the row electrodes 12a and 12b be selected in general 210 mm so that it coincides with the lateral length of and A4 size sheet (JIS) (210×297). In this case, the first row contains 1050 shutter apertures (5 dots/mm) while the second row contains also 1050 shutter apertures (5 dots/mm) and the shutter apertures in the first and second rows are arranged in a mutually staggered fashion as shown in FIG. 4.

Two polarizers are disposed outside of the first and second base plates, respectively, in a cross nicol relationship as indicated by the double-pointed arrows 21 and 22. The inner wall surfaces of the first and second base plates are so processed by rubbing or the like take a P type liquid crystal interposed between the first and second base plates is initially oriented in the directions indicated by the arrow 23 (that is, in the direction inclined about 45° with respect to the polarizing directions of polarizers).

In order to simplify the explanation of the liquid crystal shutter array of the type described, the mode of operation of only the shutter apertures $A_1$ and $A_2$ on the first row electrode 12a and shutter apertures $A_{1a}$ and $A_{2a}$ on the second row electrode 12b will be described.

Figure 5:
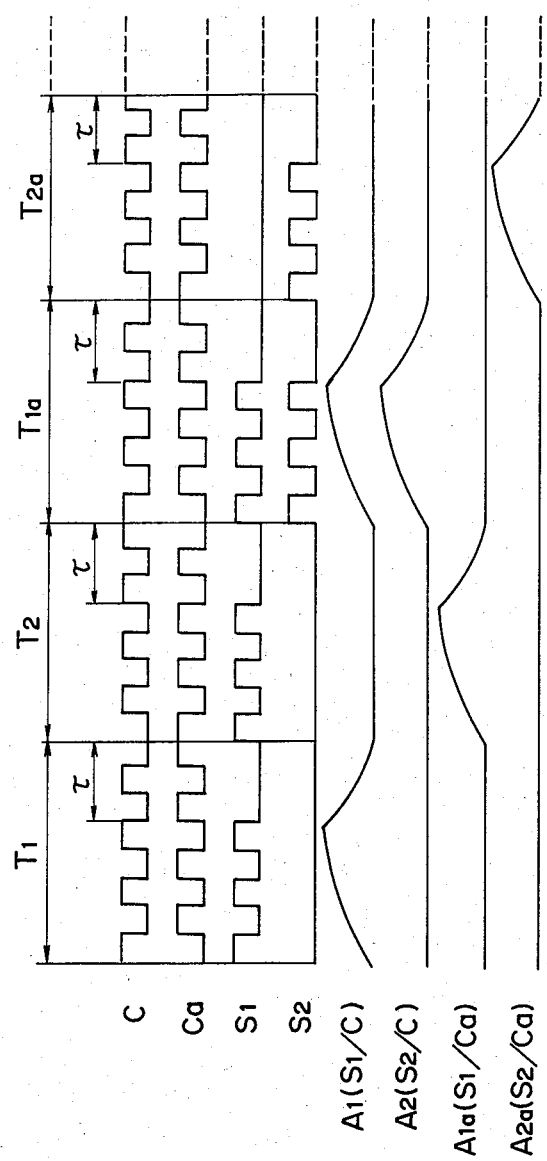
FIG. 5 is a time chart used to explain the mode of operation of a liquid crystal shutter array used in the present invention.

FIG. 5 shows a time chart used to explain the mode of operation. $T_1$, $T_{1a}$, $T_{1b}$ (not shown) . . . indicate times when all the shutter apertures on the first row electrode 12a are operated while all the shutter apertures on the second row electrode 12b remain not operated. $T_2$, $T_{2a}$, $T_{2b}$ (not shown) . . . indicate times when all the shutter apertures on the second row electrode 12 are operated while all the shutter apertures on the first row electrode 12a remain not operated or are disabled. That is, during the time period $T_1$, $T_{1a}$, $T_{1b}$, . . . , the operation of the shutter apertures $A_{1a}$ and $A_{2a}$ must not be influenced in response to the signals $S_1$ and $S_2$ applied to the signal electrodes 13a and 13b, respectively and in like manner during the time periods $T_2$, $T_{2a}$, $T_{2b}$ . . . , the operation of the shutter apertures $A_1$ and $A_2$ must not be influenced by the signals $S_1$ and $S_2$. One of the most important features of the present invention resides in the fact that the above-described problem is satisfactorily overcome.

First, the operation of each shutter aperture during $T_1$, $T_{1a}$, $T_{1b}$ . . . will be described. As shown in FIG. 5, voltages C and Ca are applied to the row electrodes 12a and 12b, respectively. In this case, the polarity of the voltage C is opposite to the polarity of the voltage Ca. Meanwhile, a voltage in phase with the voltage C applied to the row electrode 12a to be addressed (the applied voltage is turned on) or a predetermined level voltage (the applied voltage is turned off) is applied to the signal electrodes 13a and 13b so that it becomes possible to determine whether a shutter is on or off.

FIG. 5 shows an embodiment where during $T_1$ only the shutter aperture $A_1$ is turned on (that is, light is transmitted). It should be also noted that, in this embodiment, there is provided a time $\tau$ at the end of each address time required for addressing one row in order to insert the signal for causing the shutter aperture to be turned off. The reason why the shutter apertures $A_{1a}$ and $A_{2a}$ on the second row electrode 12b are turned off (light is interrupted) during $T_1$ will be described. First, the mode of operation of a liquid crystal in the shutter aperture $A_{1a}$ is dependent upon the electric field produced by the voltage Ca and the signal $S_1$. Ca and $S_1$ are opposite in polarity with respect to each other so that the liquid crystal layer in the shutter aperture $A_{1a}$ is subjected to a strong electric field. As a result, the shutter aperture $A_{1a}$ does not permit the transmission of light (that is, off-state). On the other hand, the mode of operation of the shutter aperture $A_{2a}$ is dependent upon Ca and $S_2$. Since $S_2$ is maintained at a predetermined voltage level, the liquid crystal layer of the shutter aperture $A_{2a}$ is subjected to a relatively strong electric field produced by the voltage Ca. As a result the shutter aperture $A_{2a}$ is turned off. The mode of operation of the shutter aperture $A_2$ is dependent upon the signal $S_2$ and the voltage C. Since the signal $S_2$ is maintained at a predetermined signal level, the liquid crystal layer in the shutter aperture $A_2$ is subjected to a relatively strong electric field produced by the voltage C. As a result, the shutter aperture $A_2$ remains in the off-state. In contrast to the above, the mode of operation of the shutter aperture $A_1$ is dependent upon C and $S_1$. $S_1$ and C are voltage signals in phase with each other so that a voltage which is an absolute value of $|C-S_1|$ is applied to the liquid crystal layer of the shutter aperture $A_1$. As a result, an electric field which is zero or relatively weak is produced so that a state where the shutter aperture $A_1$ permits the transmission of light (ON-state) is produced.

In like manner, during the time $T_{1a}$ for addressing the row electrode 12a, both the shutter apertures $A_1$ and $A_2$ are turned on while the shutter apertures $A_{1a}$ and $A_{2a}$ are turned off because of a relatively strong electric field produced by $S_1$, $S_2$ and Ca. In summary, during the time when the row electrode 12a is addressed, all the shutter apertures on the second row electrode 12b always remain in the OFF-state positively regardless of the states of signals $S_1$ and $S_2$.

Next, the mode of operation for addressing the second row electrode 12b during the time $T_2$, $T_{2a}$, $T_{2b}$... will be described. For instance, only the shutter aperture $A_{1a}$ is turned on during $T_2$ and only the shutter aperture $A_{2a}$ is turned on during $T_{2a}$. During the time $T_2$, $T_{2a}$, $T_{2b}$..., the polarity of the voltage Ca is opposite to the polarity of the voltage C while the signal voltages $S_1$ and $S_2$ are in phase with the voltage Ca or maintained at a predetermined constant voltage level, thereby to determine whether the shutter apertures are turned on or off. As in the cases of the shutter apertures $A_{1a}$ and $A_{2a}$ during the time $T_1$, $T_{1a}$, $T_{1b}$..., the liquid crystal layers in the shutter apertures $A_1$ and $A_2$ are normally subjected to relatively strong electric fields so that they remain in the OFF-state. On the other hand, as in the cases of the shutter apertures $A_1$ and $A_2$ during the time $T_1$, $T_{1a}$, $T_{1b}$..., the shutter apertures $A_{1a}$ and $A_{2a}$ are turned on or off depending upon the signals $S_1$ and $S_2$.

The time $\tau$ provided at the end of each time $T_1$, $T_2$, $T_{1a}$, $T_{2a}$, $T_{1b}$, $T_{2b}$... is for turning off the shutter aperture. That is, the shutter apertures are turned off when the signals $S_1$ and $S_2$ are brought to a constant voltage level. By inserting this erasure signal, the transmission of light can be positively prevented by the shutter aperture which is to be subsequently turned off.

In this way, light signals through two-row of shutter apertures can be alternately written on a photosensitive drum.

In the case of a shutter array in which shutter apertures are arranged in three rows, when the distance between the adjacent shutter apertures which are disposed in series is 2.4–3.3 times more preferably 2.6–3.0 times and particularly preferably 2.7–2.8 times the length in the axial direction of the row of the shutter apertures, "blur" of a dot image can be effectively prevented so that resolution and sharpness of an image can be improved.

Next, this embodiment of the present invention will be described with reference to the accompanying drawings.

Figure 7:
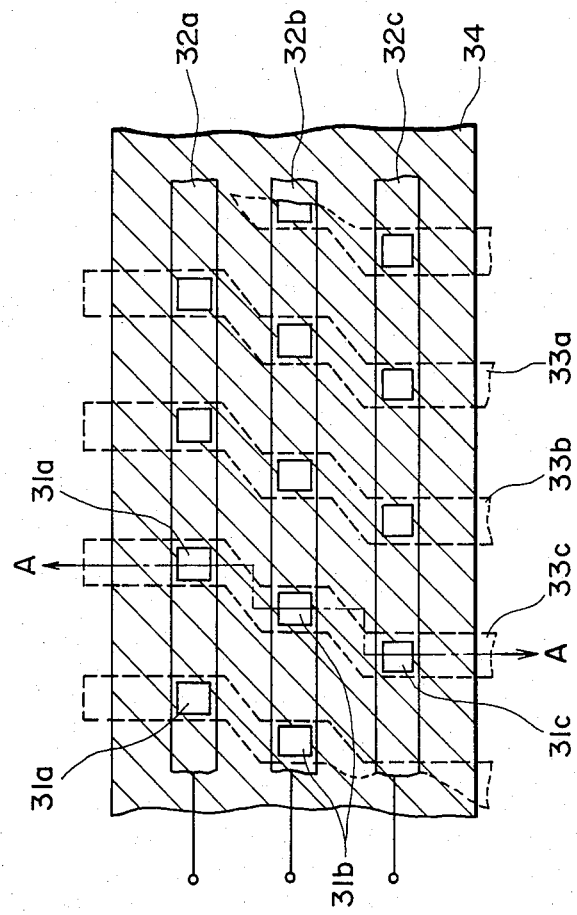
FIG. 7 is a plan view of a liquid crystal shutter array used in the present invention.
Figure 8:
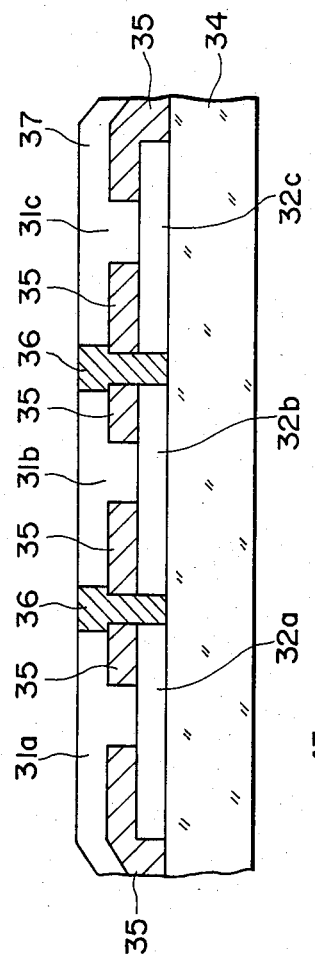
FIG. 8 is a sectional view of row electrodes taken along the line A—A of FIG. 7.

As shown in FIGS. 7 and 8, three rows of shutter apertures 31 (31a, 31b and 31c) are arranged in a mutually staggered fashion. That is, a plurality of shutter apertures 31 (31a) in the first now are staggered relative to a plurality of shutter apertures (31b) in the second row, which in turn are staggered relative to a plurality of shutter apertures (31c) in the third row. The shutter apertures 31a are disposed at the intersections of a first row electrode 32a with signal electrodes 33a, 33b, 33c, 33d, ...; the shutter apertures 31b are disposed at the intersections of a second row electrode 32b with the signal electrodes 33a, 33b, 33c, 33c, ...; and the shutter apertures 31c are disposed at the intersections of a third row electrode 32c with the signal electrodes 33a, 33b, 33c, 33d, ... As shown in FIG. 8, the first, second and third row electrodes 32a, 32b and 32c are formed on a base plate 34 (such as glass, plastic or the like) and a metal light-shielding mask 35 is formed over the row electrodes 33a, 33b and 33c except the areas which constitute the shutter apertures 31a, 31b and 31c. Colored insulating films 36 are interposed between the adjacent row electrodes 32a, 32b and 32c. Reference numeral 37 designates an insulating film of a synthetic resin.

The liquid crystal shutter array illustrated in FIG. 7 and having the electrode plate as shown in FIG. 8 can be obtained in substantially the same manner as has been explained with respect to the liquid crystal shutter array illustrated in FIGS. 1 and 2.

Figure 9:
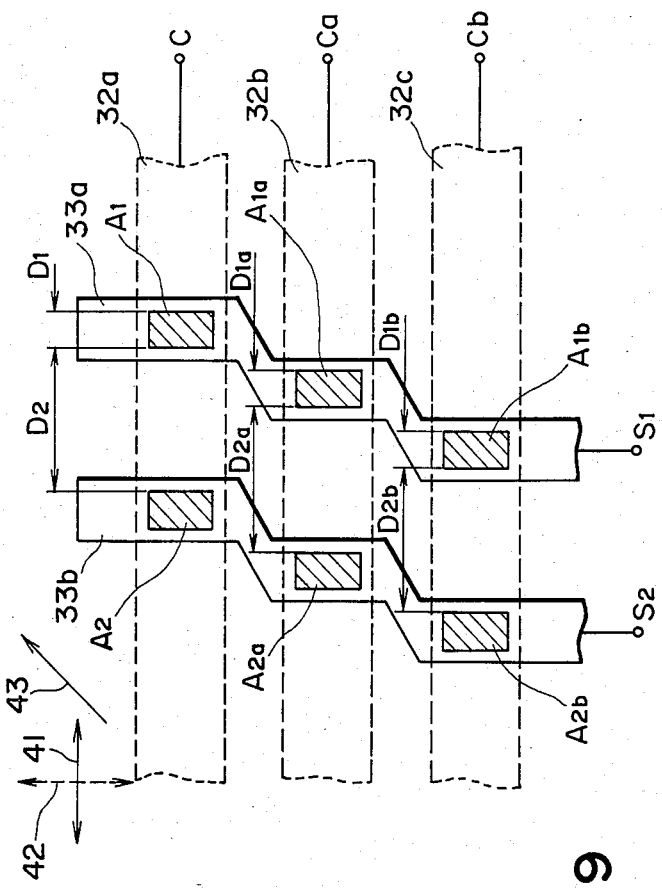
FIG. 9 is a plan view of opposed electrodes consisting of row electrodes and signal electrodes used in the present invention.

FIGS. 7 and 9 illustrate an electrode arrangement for a liquid crystal shutter array of a ⅓ time-sharing driving system. In a liquid crystal shutter array as shown in FIG. 9, the three row electrodes 32a, 32b and 32c are formed on a first base plate while the signal electrodes 33a, 33b, 33c, 33d, ... which intersect with the row electrodes 32a, 32b and 32c are disposed on a second base plate disposed opposite to the first base plate. The shutter apertures $A_1$, $A_2$, $A_3$, ...; $A_{1a}$, $A_{2a}$, $A_{3b}$, ... at the intersections of the row electrodes 32a, 32b and 32c with the signal electrodes 33 are hatched in the figure. As described above, these three rows of shutter apertures are disposed in mutually staggered relationship. The length $D_1$ in the axial direction of the first row of the shutter apertures $A_1$, $A_2$, $A_3$, ...; the length $D_{1a}$ in the axial direction of the second row of the shutter apertures $A_{1a}$, $A_{2a}$, $A_{3a}$, ...; the length $D_{1b}$ in the axial direction of the third row of the shutter apertures $A_{1b}$, $A_{2b}$, $A_{3b}$, ...; the distance $D_2$ between adjacent shutter apertures $A_1$ and $A_2$, $A_2$ and $A_3$ (not shown), ...; the distance $D_{2a}$ between adjacent shutter apertures $A_{1a}$ and $A_{2a}$, $A_{2a}$ and $A_{3a}$ (not shown), ...; and the distance $D_{2b}$ between the adjacent shutter apertures $A_{1b}$ and $_{2b}$, and $A_{2b}$ and $A_{3b}$ (not shown), ... are set to satisfy the following conditions as described above:

$$D_2 = (2.4-3.3) \times D_1$$

$$D_{2a} = (2.4-3.3) \times D_{1a}$$

$$D_{2b} = (2.4-3.3) \times D_{1b}$$

It is preferred that the lengths $D_1$, $D_{1a}$ and $D_{1b}$ be 70–90 μm, respectively, and that the distances $D_2$, $D_{2a}$ and $D_{2b}$ be 210–230 μm, respectively. In a most preferred example, the lengths $D_1$ and $D_{1a}$ are 80 μm and that the distances $D_2$ and $D_{2b}$ are 220 μm.

The longitudinal length of the row electrodes 32a, 32b and 32c is selected in general to be 210 mm which coincides with the shorter length of a A4 size (JIS) sheet. In this case, the first row contains 666 shutter apertures (10/3 dots/mm); the second row contains 666 shutter apertures (10/3 dots/mm); and the third row contains also 666 shutter apertures (10/3 dots/mm). Furthermore, as described above, in the first, second and third rows of shutter apertures are staggered relative to each other.

Polarizers are disposed outside of the first and second base plates, respectively, in a cross nicol relationship as indicated by double-pointed arrows 41 and 42. The inner wall surfaces of the first and second base plates are so processed by rubbing or the like that a P type liquid crystal interposed between the first and second base plates is initially oriented in the direction as indicated by the arrow 43 (that is, at about 45° relative to the directions of polarization of the polarizers, respectively).

Figure 10:
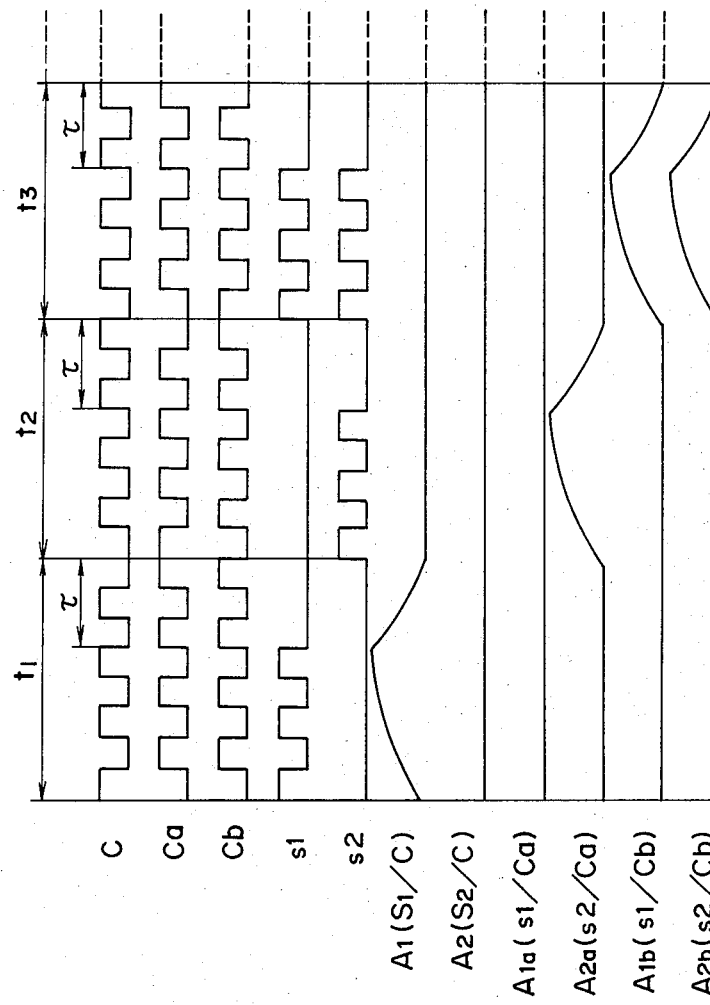
FIG. 10 is a time chart used to explain the mode of operation of a liquid crystal shutter array in accordance with the present invention.

The time chart as shown in FIG. 10 illustrates that during the time $t_1$, the shutter aperture $A_1$ is turned on; during the time $t_2$, the shutter aperture $A_{2a}$ is turned on; and during the time $t_3$, the shutter apertures $A_{1b}$ and $A_{2n}$ are turned on. As is clear from FIG. 10, only shutter apertures in the row to be addressed can be turned on or off when the voltage whose polarity is opposite to the polarity of voltages applied to the other row electrodes is applied to the addressed row electrode, and the signals have the same polarity as the voltage applied to the addressed row electrode or are maintained at a constant voltage level. Also in this embodiment, the erasure time $\tau$ is provided so that the transmission of light through the shutter apertures which are in the OFF-state can be positively prevented.

The erasure time $\tau$ provided at the end of each time period is for turning off all the shutter apertures. This can be effected by maintaining the signals $S_1$ and $S_2$ at a constant voltage level. By inserting such erasure signal, the transmission of light through a shutter aperture which is to be subsequently turned off can be positively prevented. In this way, light signals through a three-row shutter array can be sequentially written on a photosensitive drum.

Figure 6:
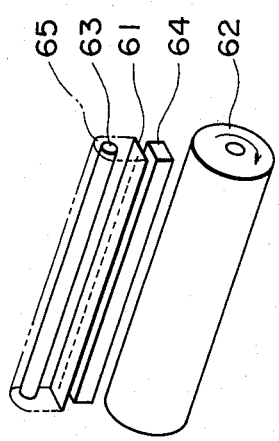
FIG. 6 is a schematic perspective view of an electrophotographic printer (image forming apparatus) with a liquid crystal shutter array in accordance with the present invention.

FIG. 6 is a schematic view of a printer in which light signals are applied through a liquid crystal shutter array to a photosensitive body, but does not show a charger and the like. Reference numeral 61 designates a liquid crystal shutter array; 62, a photosensitive drum (or a drum with an electrophotographic photosensitive layer); 63, a light source (such as a fluorescent lamp); 64, a Selfoc lens array; and 65, a light collecting cover. As described hereinbefore when the liquid crystal shutter array is used, a printer can be made compact in size and light in weight as compared with the conventional laser beam printers.

In the case of an electrophotographic printer with a two-row shutter array in which the length of each shutter aperture in the axial direction of each row is 70–90 μm; the distance between the adjacent shutter apertures is 110–130 μm; and the shutter apertures in one row are staggered relative to those in the other row, a dot image can be formed in a size of about 100 μm. As a result, sharpness of an dot image can be improved and consequently no density variation exists in one line image. Thus, an image with high quality can be reproduced.

Further, in the case of an electrophotographic printer with the three-row shutter array in which the length of the shutter apertures in the axial direction of each row is 70–90 μm; the distance between the adjacent shutter apertures in each row is 210–230 μm; and the three rows of shutter apertures are staggered relative to each other, a dot image is formed in a size of about 100 μm. As a result, sharpness of a dot image can be improved and consequently no density variation exists in one line image. Thus, an image with high quality can be reproduced.

According to a preferred embodiment of the present invention, when the shutter array element is incorporated into an electrophotographic printer, a base plate of the element on which a light-shielding mask is formed except for those areas constituting shutter apertures may be disposed on or caused to face the side of the light source.

This preferred embodiment will be described in detail with reference to FIG. 11. A common electrode 518 is formed with a metal light shielding mask 514. The area between portions of the light shielding mask 514 may be light-shielded, preferably with an insulating film. In the liquid crystal-optical shutter array element, polarizers 517 and 517a are disposed outside of a first base plate 515 and a second base plate 516, respectively, in a cross nicol relationship with each other. The inner wall surfaces of the first base plate 515 with the common electrode 518 and of the second base plate 516 with a data signal electrode 519 are processed by rubbing or the like so that a nematic liquid crystal with a positive dielectric anisotropy interposed between the first and second base plates 515 and 516 may be initially oriented at about 45° relative to both directions of polarization of the polarizers.

Figure 11A:
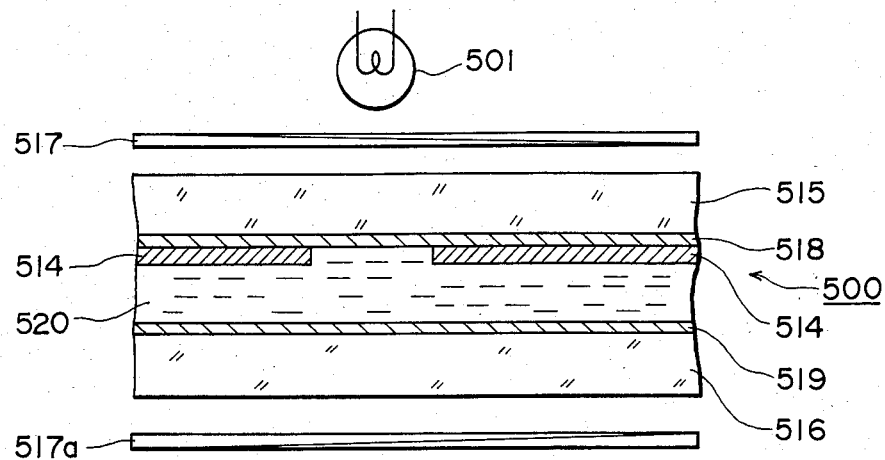
FIG. 11(a) is a schematic sectional view of a light signal generating means used in the present invention.

The shutter array element of the type described is driven in a manner substantially similar to that described above so that an image is exposed on a photosensitive member, but it was observed that copy quality obtained when the base plate 515 with the metal light-shielding mask 514 is disposed on the side of a light source 501 is different from copy quality obtained when the base plate 515 is disposed on the side of a photosensitive drum 502. That is, when the metal light-shielding mask 514 is disposed on the side of the light source 501 as shown in FIG. 11(a), "blur" is eliminated and resolution is improved.

Figure 11B:
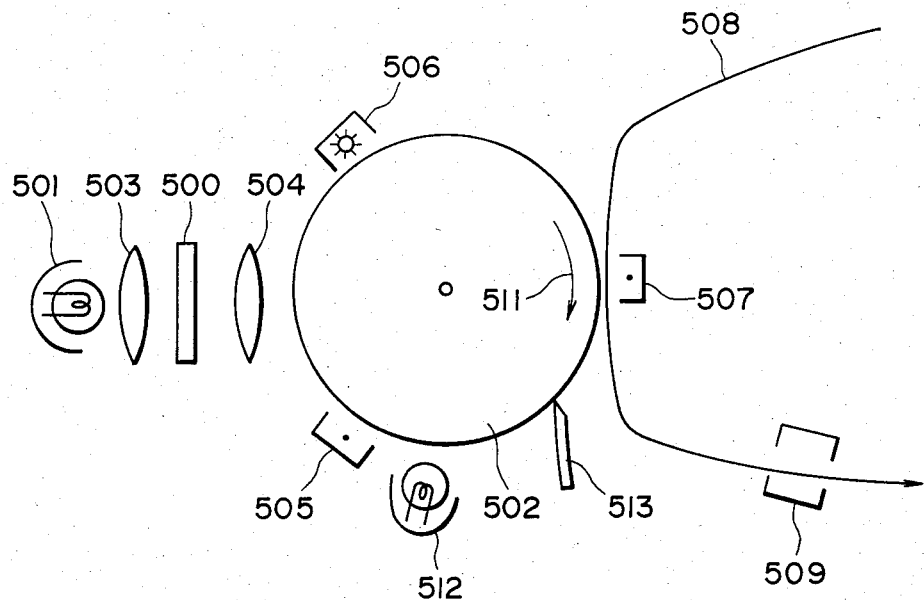
FIG. 11(b) is a sectional view of an electrophotographic printer (image forming device) in accordance with the present invention.

FIG. 11(b) is a view used to explain an electrophotographic printer utilizing a shutter array element 500 in accordance with the present invention. The light source (that is, a light source for generating light signals) 501 is normally turned on to illuminate the liquid crystal optical shutter array device 500. A liquid crystal drive circuit (not shown) causes the shutter array element 500 to select the areas which do not permit the transmission of light from the light source 501 and the areas which permit the transmission of light from the light source 501, whereby light signals are produced. Thus, the light rays or beams which illuminate the photosensitive drum 502 can be controlled. It is preferred that lenses 503 and 504 are disposed between the light source 501 and the shutter array element 500 and between the shutter array 500 and the photosensitive drum 502, respectively, so that the light rays emitted from the light source 501 and the shutter array element 500 may be condensed.

The photosensitive drum 502 which rotates in the direction indicated by an arrow 511 is wholly exposed by pre-exposure means 512 prior to the illumination of light signals and thereafter positively or negatively charged by charging means 505 provided with a corona discharging device or the like. The areas of the photosensitive drum 502 exposed to light signals are discharged so that an electrostatic latent image is formed. In this case, the light source 501 incorporated in the shutter array element 500 may also function as a light source of the pre-exposure means 512. The light sources may be a halogen lamp, a fluorescent lamp or the like. At a developing station 506, the developing latent image may be developed by the magnetic brush method or the like with a developer agent comprising carrier and a toner which has a polarity opposite to that of the charged image in the case of ordinary development or has the same polarity as the charged image in the case of reversal development, while a developing bias is applied. After the electrostatic latent image has been developed in the manner described above, the developed image is transferred to an image carrying medium (such as a sheet of paper) 508 at an image transfer station 507. Thereafter, the transferred image is fixed by heat or pressure at a fixing station 509 so that printed matter with a completely fixed image can be obtained.

After passing the image transfer station 507, the photosensitive drum 502 is treated with a cleaning means 513 so that the remaining toner is removed therefrom.

A photosensitive member which receives light signals emitted from the shutter array element 500 is not limited to the photosensitive drum 502 of the electrophotographic printer of the type described above and it is to be understood that a silver salt photographic sensitive material (such as monochrome paper or color paper or "Dry Silver" mfd. by 3M Corp., U.S.A.) may also be used.

What is claimed is:

1. An image forming apparatus comprising a light source, a photosensitive member, and a liquid crystal-shutter array device disposed so as to receive and modulate light rays from the light source and illuminate the photosensitive member with the modulated light rays; said liquid crystal-shutter array device comprising:
   two rows of transparent elongated electrodes;
   a plurality of transparent signal electrodes disposed oppositely spaced from and intersecting with the elongated row electrodes so as to provide two rows of shutter apertures at respective intersections, said two rows of shutter apertures being arranged in a mutually staggered fashion, the distance between an adjacent pair of the shutter apertures in each row being 1.22 to 2.0 times the length of one shutter aperture in the row in the direction of the extension of the row of shutters;
   a liquid crystal disposed between the elongated row electrodes and the plurality of signal electrodes; and
   a metallic film coating the two elongated row electrodes except for the portions forming the shutter apertures.

2. An image forming apparatus comprising a light source, a photosensitive member, and a liquid crystal-shutter array device disposed so as to receive and modulate light rays from the light source and illuminate the photosensitive member with the modulated light rays; said liquid crystal-shutter array device comprising:
   three rows of transparent elongated electrodes;
   a plurality of transparent signal electrodes disposed oppositely spaced from and intersecting with the elongated row electrodes so as to provide three rows of shutter apertures at respective intersections, said three rows of shutter apertures being arranged in a mutually staggered fashion, the distance between an adjacent pair of the shutter apertures in each row being 2.4 to 3.3 times the length of one shutter aperture in the row in the direction of the extension of the row of shutters;
   a liquid crystal disposed between the elongated row electrodes and the plurality of signal electrodes; and
   a metallic film coating the three elongated row electrodes except for the portions forming the shutter apertures.

3. An image forming apparatus according to claim 1 wherein the distance between an adjacent pair of the shutter apertures in each row is 1.4–1.8 times the length of one shutter aperture in the direction of extension of the row.

4. An image forming apparatus according to claim 1 wherein the distance between an adjacent pair of the shutter apertures in each row is 1.5–1.6 times the length of one shutter aperture in the direction of extension of the row.

5. An image forming apparatus according to claim 1 wherein said photosensitive member comprises a drum provided with an electrophotographic photosensitive layer.

6. An image forming apparatus according to claim 5 wherein around said drum are disposed pre-exposure means, charging means, said shutter array element with a light source, developing means, image transfer means and cleaning means in the order named in the direction of rotation of said drum.

7. An image forming apparatus according to claim 2 wherein the distance between an adjacent pair of the shutter apertures in each row is 2.6–3.0 times the length of one shutter aperture in the direction of extension of each row.

8. An image forming apparatus according to claim 2 wherein the distance between an adjacent pair of the shutter apertures in each row is 2.7–2.8 times the length of one shutter aperture in the direction of extension of each row.

9. An image forming apparatus according to claim 2 wherein said photosensitive member comprises a drum provided with an electrophotographic photosensitive layer.

10. An image forming apparatus according to claim 9 wherein around said drum are disposed pre-exposure means, charging means, said shutter array with a light source, developing means, image transfer means and cleaning means in the order named in the direction of rotation of said drum.

11. An image forming apparatus comprising a shutter array element comprising a pair of base plates, one of which has a plurality of data signal electrodes and the other of which has at least one row electrode disposed in opposed relationship with said plurality of data signal electrodes, and a liquid crystal interposed between said plurality of data signal electrodes and said at least one row electrode; a light source; and a photosensitive member; a metallic light shielding mask being formed on either one of said pair of base plates, over said plurality of data signal electrodes or said at least one row electrode except those areas which define shutter apertures; said light source being disposed on the side of said one of the pair of base plates on which the metallic light shielding mask is formed.

12. An image forming apparatus according to claim 11, wherein said photosensitive member comprises a drum provided with an electrophotographic photosensitive layer.

13. An image forming apparatus according to claim 12 wherein around said drum are disposed pre-exposure means, a shutter array element with a light source, developing means, image transfer means and cleaning means in the order named in the direction of rotation of said drum.

14. An image forming apparatus according to claim 11 wherein said shutter apertures are arranged in two rows each comprising a plurality of shutter apertures, said two rows of shutter apertures being arranged in mutually staggered fashion.

15. An image forming apparatus according to claim 14 wherein the distance between an adjacent pair of the shutter apertures in each row is 1.22–2.0 times the length of one shutter aperture in the direction of extension of each row.

16. An image forming apparatus according to claim 11 wherein said shutter apertures are arranged in three rows each comprising a plurality of shutter apertures said three rows of shutter apertures are arranged in mutually staggered fashion.

17. An image forming apparatus according to claim 16 wherein the distance between an adjacent pair of the shutter apertures in each row is 2.4–3.4 times the length of one shutter aperture in the direction of extension of each row.

18. An image forming apparatus according to claim 11 wherein a lens array is interposed between said shutter array element and said photosensitive member.

19. An image forming apparatus according to claim 13 wherein the light source for said pre-exposure means is also used as a light source for a light signal generating means.

* * * * *

UNITED STATES PATENT AND TRADEMARK OFFICE
CERTIFICATE OF CORRECTION

PATENT NO. : 4,636,817

DATED : January 13, 1987

INVENTOR(S) : YUICHI MASAKI

It is certified that error appears in the above-identified patent and that said Letters Patent is hereby corrected as shown below:

COLUMN 1

Line 25, "movably" should read --movable--.
Line 35, "times-" should read --time- --.

COLUMN 3

Line 50, "1 C. for" should read --C. for--.

COLUMN 4

Line 14, "rinsed" should read --being rinsed--.
Line 18, "fluorethylene" should read --fluoroethylene--.
Line 55, "PA film" should read --PVA film--.
Line 58, "rinsed" should read --being rinsed--.
Line 59, "isoporpyl" should read --isopropyl--.

COLUMN 5

Line 50, "aperatures" should read --apertures--.
Line 53, "$A_{1a}$" should read --($A_{1a}$--.
Line 63, "examples" should read --example--.
Line 68, "and" should read --an--.

COLUMN 6

Line 11, "take" should read --so that--.

COLUMN 7

Line 45, "A 2" should read --$A_2$--.
Line 54, "ture." should read --tures.--.

UNITED STATES PATENT AND TRADEMARK OFFICE
CERTIFICATE OF CORRECTION

PATENT NO. : 4,636,817

DATED : January 13, 1987

INVENTOR(S) : YUICHI MASAKI

It is certified that error appears in the above-identified patent and that said Letters Patent is hereby corrected as shown below:

COLUMN 8

Line 9, "now" should read --row--.
Line 17, "33c, 33c," should read --33c, 33d,--.
Line 43, "$A_{2a}$, $A_{3b}$," should read --$A_{2a}$, $A_{3a}$,...; and $A_{1b}$, $A_{2b}$, $A_{3b}$,--.
Line 57, "and $2_b$," should read --and--.
Line 58, "and" should read --$A_{2b}$,--.

COLUMN 9

Line 6, "a" should read --an--.
Line 66, "an dot" should read --a dot--.

Signed and Sealed this

Sixth Day of October, 1987

Attest:

DONALD J. QUIGG

Attesting Officer

Commissioner of Patents and Trademarks